United States Patent
Hsieh et al.

[19]

[11] Patent Number: 6,133,818
[45] Date of Patent: Oct. 17, 2000

[54] REDUNDANT FUSE WIRE RELEASE DEVICE

[75] Inventors: Cindy Hsin-I Hsieh, San Jose; Varouj G. Baghdasarian, Cupertino, both of Calif.

[73] Assignee: Space Systems/Loral, Inc., Palo Alto, Calif.

[21] Appl. No.: 09/371,621

[22] Filed: Aug. 11, 1999

[51] Int. Cl.[7] .......................... G05G 17/00; A62C 37/04
[52] U.S. Cl. .................. 337/401; 337/1; 337/5; 337/140; 74/2; 403/2; 403/28
[58] Field of Search .................. 337/1, 2, 4, 5, 337/140, 401, 402, 403, 159, 160, 231, 273, 279, 281, 280, 282, 291, 296, 412, 416; 74/2; 403/2, 28

[56] References Cited

U.S. PATENT DOCUMENTS

| | | | |
|---|---|---|---|
| 3,163,732 | 12/1964 | Abbott et al. | 200/116 |
| 3,359,804 | 12/1967 | Phillips | 74/2 |
| 3,695,116 | 10/1972 | Baur | 74/2 |
| 3,735,315 | 5/1973 | Swarbrick et al. | 337/290 |
| 3,863,720 | 2/1975 | Young | 169/59 |
| 3,924,688 | 12/1975 | Cooper et al. | 169/61 |
| 4,511,876 | 4/1985 | Urani | 337/244 |
| 4,617,544 | 10/1986 | Mooz et al. | 337/3 |
| 4,788,622 | 11/1988 | Cinquin | 361/124 |
| 4,973,931 | 11/1990 | Herbert | 337/139 |
| 5,046,426 | 9/1991 | Julien et al. | 102/377 |
| 5,471,888 | 12/1995 | McCormick | 74/2 |
| 5,606,889 | 3/1997 | Bielinski et al. | 74/2 |
| 5,621,373 | 4/1997 | McCormick | 337/1 |
| 5,748,066 | 5/1998 | Holt | 337/1 |

FOREIGN PATENT DOCUMENTS

| | | | |
|---|---|---|---|
| 10-244998 | 9/1998 | Japan | B64G 1/44 |

*Primary Examiner*—Leo P. Picard
*Assistant Examiner*—Anatoly Vortman
*Attorney, Agent, or Firm*—Perman & Green, LLP

[57] ABSTRACT

A highly reliable release apparatus which is used to stow or release desired devices such as, for example, solar arrays, antenna positioning mechanisms, reflectors, found on satellites, space stations or spacecraft. Deployment of the desired device is prevented or allowed by respectively restraining or releasing a first member under tension. The apparatus comprises a support member having an opening and a first face arranged about the opening. A second member is located within the opening when the first member is in tension and is adapted to be attached to an end of the first member. At least three locking members such as fuse wires are arranged on the first face of said support member for restraining the second member within the opening in order to maintain tension on the first member. The second member is attached to the first member in a manner such that at least two of the fuse wires must be severed before the restraint on the second member is released. A system is provided for actuating the release apparatus by selectively severing at least two of the locking members when deployment of the device is desired.

16 Claims, 6 Drawing Sheets

REDUNDANT FUSE WIRE RELEASE DEVICE

1. Field of the Invention

This invention relates to a highly reliable release device which is used to stow or release items such as solar arrays, antenna positioning mechanisms, reflectors, etc., found on satellites, space stations, spacecraft, etc. The purpose of this invention is to eliminate the single-point failure of the locking feature of the release device.

2. Prior Art

A typical prior art non-explosive release apparatus, such as a separation spool device, is used to stow or release a captured member which constrains the deployment of a spacecraft element, such as a solar array, in the stowed position. In such a prior art apparatus a single fuse wire acts as a locking member which fastens a tensioned member wrapped in tension around a split spool. When the tensioned member is under tension the split spool is clamped to a portion of the device to be deployed (the captured member) which prevents deployment of the mechanism such as a solar array. Once the release device is actuated, the fuse wire unlocks by being self-destructed in tension, thereby releasing the tensioned member to unclamp the captured member and allow deployment.

However, such a single fuse wire locking member is subject to self-unlocking due to mechanical failure. The single locking member (fuse wire) can fail due to mechanical stress and cause premature release of the device. There is no apparent solution which can eliminate this single-point failure mode without modifying the fuse configuration requirement. An electrical failure can also prevent the device from releasing by preventing adequate current from flowing to melt the fuse wire upon actuation.

SUMMARY OF THE INVENTION

The release apparatus of this invention creates at least a triple-locking member configuration (for example, fuse wires) which allows a single-fuse mechanical failure without prematurely releasing the tensioned member. This invention can be applied in any desired application requiring a high reliability release mechanism.

In accordance with one embodiment of this invention a high reliability release apparatus is provided for controlling the deployment of a desired device by restraining or releasing a first member under tension, which respectively prevents or allows the deployment of the device. The apparatus comprises a support member having an opening and a first face arranged about the opening. A second member is located within the opening when the first member is in tension and is adapted to be attached to an end of the first member. At least three locking members are arranged on the first face of the support member for restraining the second member within the opening in order to maintain tension on the first member. The second member is attached to the first member in a manner such that at least two of the locking members must be severed before the restraint on the second member is released. A system is provided for actuating the release apparatus by selectively severing at least two of the locking members when deployment of the device is desired.

In accordance with another embodiment of this invention electrical contacts are supported by the support member about the opening and the locking members comprise fuse wires which are attached to the electrical contacts to form a generally triangular arrangement over the opening.

In accordance with another embodiment of this invention the control system is adapted to sever the fuse wires by applying a current to them. The fuse wires are arranged in two paths in parallel. The first primary path contains a single one of the fuse wires which will be first severed by melting due to the application of a higher current. The second fuse path contains a second and third of the fuse wires in series, whereby following the severing of the first fuse wire all of the input current flows through the second fuse path to sever at least one of the remaining fuse wires.

In accordance with another embodiment of this invention the second member has an essentially planar first face for engaging the fuse wires. The connection between the first member and the second member is a swivel arrangement which allows the first face of the second member to swivel about a longitudinal axis of the first member. Upon the severing of two of the fuse wires the second member pivots out of engagement with the remaining fuse wire to release the tension on the first member and allow the device to deploy.

Most preferably, in accordance with another embodiment of this invention, the second member has curved second face opposed to the first planar face and a centrally located hole extending from the first planer face to the second curved face, the hole flaring outwardly from the first planer face to the second curved face. In this embodiment the first member extends through the hole in the second member from the planer face toward the second face and includes a round termination at its free end which is adapted to engage the flared wall of the hole so that the second member can swivel about the longitudinal axis of the first member.

In the most preferred embodiment the opening is generally circular and the first face of the second member is generally circular with a diameter smaller than the opening. In this embodiment the second face is generally hemispherical and the second member includes a series of slots. The slots extend from the first face of the second member to the second face of the member with each of the slots being arranged so that it is adjacent each of the electrical contacts. The slots serve to prevent the fuse wires from slipping off the first face of the second member.

Accordingly it is an aim of this invention to provide an improved release apparatus which is highly reliable and is not subject to single point failure of a locking member such as a fuse wire which is used to restrain deployment of a desired device such as, for example, a solar array, antenna positioning mechanism, or a reflector of a satellite, spacecraft, or space station.

BRIEF DESCRIPTION OF THE DRAWINGS

In the accompanying drawings corresponding reference numbers refer to similar components. The foregoing aspects and other features of the invention are explained in the following description, taken in connection with the accompanying drawings, wherein.

DETAILED DESCRIPTION OF THE PREFERRED EMBODIMENTS

Figure 1:
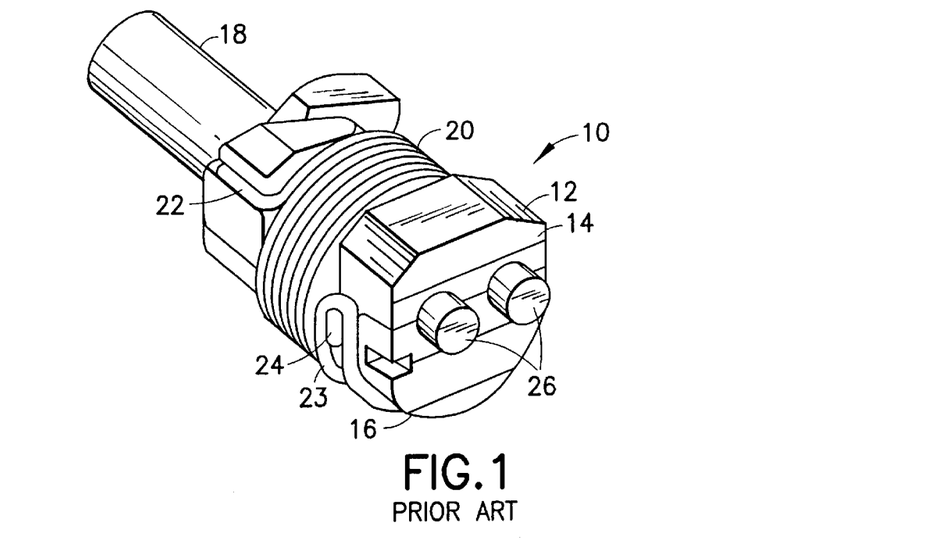
FIG. 1 is a perspective view of a release apparatus in accordance with the prior art.

Referring to FIG. 1 there is shown a typical prior art non-explosive release apparatus 10. It employs a separation spool device 12 comprising top and bottom members 14 and 16 adapted to clamp about a portion 18 (captured member) of the device to be deployed. A tensioned member 20 such as a spring wire is tightly wrapped under tension about the spool device 12. One end 22 of the tensioned member 20 is connected as shown to the top member 14. The other second end 23 of the tensioned member 20 is held in place by a single fuse wire 24 which acts as a locking member to fasten the tensioned member 20 to the spool device 12 so that it is wrapped in tension around the spool. In this design, the other end 23 of the tensioned member is shaped like a hook or loop which is held in place by a single arc-shaped fuse wire 24 connected to the electrical contacts 26.

When the tensioned member 20 is under tension the top and bottom members 14 and 16 of the split spool 12 are clamped to each other preventing the captured member 18 from retracting from the spool 12, therefore preventing deployment of the desired device such as a solar array, antenna positioning mechanism, reflector, etc., found on satellites, spacecraft, space stations, etc. The release device is actuated by inputting a specified minimum amount of current through the single fuse wire 24 which causes the fuse wire to melt and release the tensioned member 20. Consequently, the tensioned member 20 loses its tension and unwraps or loosens around the split spool 12. The members 14 and 16 of the split spool 12 separate releasing the captured member 18 and allowing the desired device to deploy.

However, such a single fuse wire locking member 24 is subject to self-unlocking due to mechanical failure of the fuse wire locking member 24, such as by vibration. The single locking member 24 can fail due to mechanical stress and cause premature release of the captured member 18. In the prior art design, the hooked end 23 of the tensioned member 20 can possibly catch on other components and stop the release motion. Further, an electrical failure can prevent the split spool device 12 from releasing by preventing adequate current from being applied to melt the fuse wire 24 when desired.

Referring now to FIGS. 2–8 there is shown a preferred release apparatus 30 of the present invention. for controlling the deployment of a desired device (not shown) by restraining or releasing a first member 31 under tension which respectively prevents or allows the deployment of the device. The first member is preferably a wire or a spring which is tightly wrapped about a split spool clamping device 32, however any desired type of clamping device could be used which is adapted to clamp a device portion 18 under the action of a member in tension and release the device portion 18 when the tension on the member is lessened or removed. The preferred split spool 32 has opposing first and second members 34 and 36 arranged to clampingly engage a portion 18 of the device to be deployed. A first end 28 of the member 31 is attached to a flange of a post 143 of the split spool 32. The posts 143 and 120 are fastened to a support member 38. A support member 38 has a base portion 40 for supporting the split spool 32 with the axis 42 of the device portion 18 being arranged normal to the base portion 40. The support member 38 also has a locking member support portion 44 extending in a direction normal to the base portion 40. The locking member support 44 has an opening 46 with a first face 48 of the support portion 44 being arranged about the opening.

Figure 5:
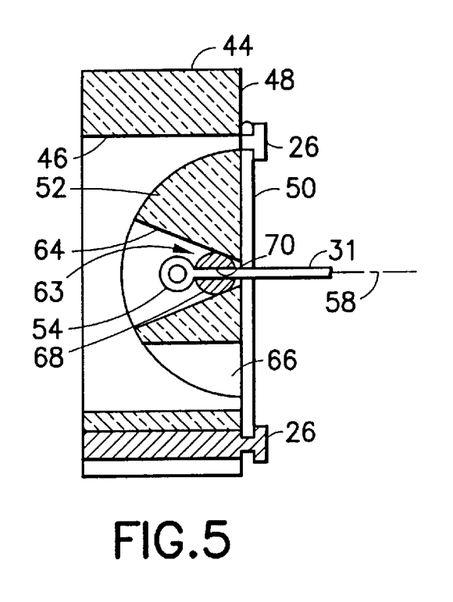
FIG. 5 is a partial cross-sectional side view of the tension member retention system of the apparatus of FIG. 2.
Figure 7:
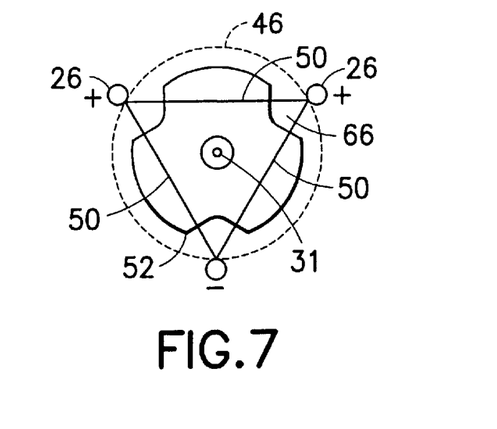
FIG. 7 is a partial front view of the tension member retention system of the apparatus of FIG. 2.

At least three locking members 50 are arranged on the first face 48 of the support portion 44 so that they, at least in part, overlie the opening 40. The locking members 50 preferable comprise fuse wires which may be severed or destructed by melting to release the tensioned member 31, however, they may be any desired non-explosive structure which can be severed by application of a signal such as a current. A second member 52 connected to the other end 54 of the tensioned first member 31 is arranged within the opening 46 behind the locking members 50 and in engagement with them. The locking members 50 restrain the second member 52 within the opening 46 in the support 44 in order to maintain tension on the first member 31. Preferably the second member 52 is held in place by locking members 50 which are arranged in a triangular configuration as shown in FIG. 7 and is restrained to move inside a generally cylindrical opening 46 as shown in FIG. 5. However any desired configuration or number of the locking members 50 could be used provided that the tensioned member 31 can not be released by the destruction of just a single locking member.

Figure 8A:
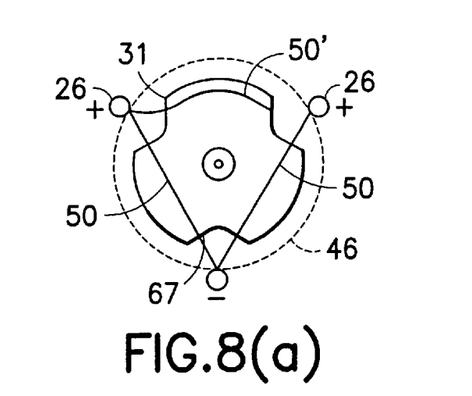
FIG. 8 is a series of schematic front views of the tension member retention system of FIG. 2 illustrating the effect on restraining the release of the second member when one and only one fuse wire is severed.
Figure 8B:
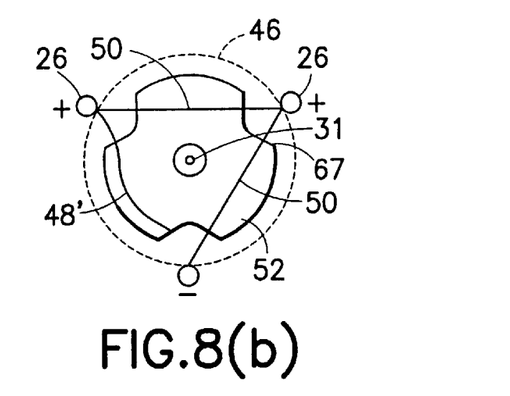
Figure 8C:
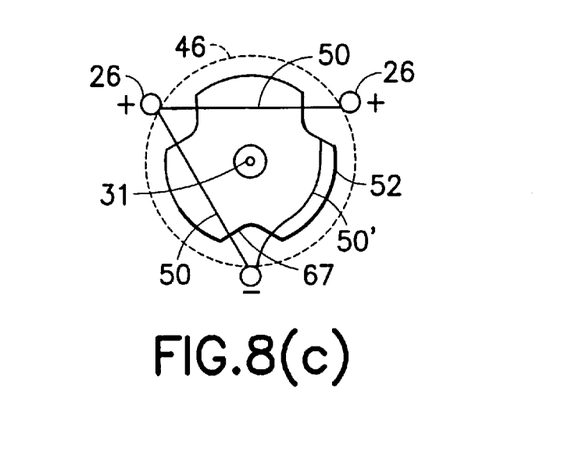

Preferably as shown in FIG. 8, the second member 52 is attached to the first member 31 in a manner such that at least two of the locking members 50 must be severed before the restraint on the second member 52 is released. The destruction of any one of the locking members 50 as shown will still leave two others which are sufficient to prevent release of the second member 52 thereby eliminating a single point failure mode. In FIG. 8(a) the upper locking member or fuse 50' is severed and the second member 52 moves upwardly in the opening 46 but is held in place by the two remaining locking members 50. Similarly in FIGS. 8(b) and 8(c) the severed member 50' allows movement of the second member 52 to the wall of the opening 46 but it remains locked in place by the unsevered locking members 50.

Figure 9:
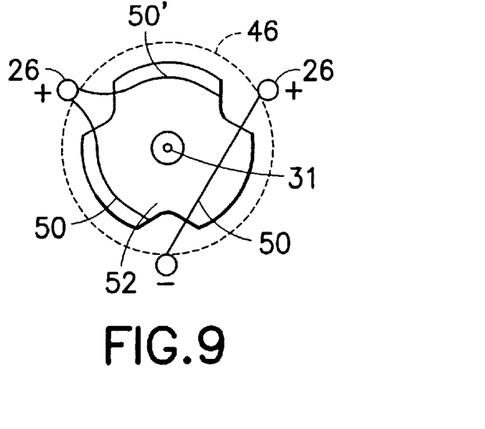
FIG. 9 is a schematic view in accordance with an embodiment of this invention showing the fuse wires following actuation of the release apparatus.
Figure 10:
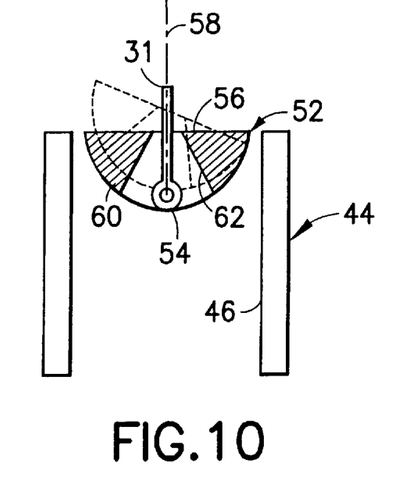
FIG. 10 is a partial cross-sectional side view of the tension member retention system of the apparatus of FIG. 2 illustrating the movement of the second member upon actuation as in FIG. 9.
Figure 11:
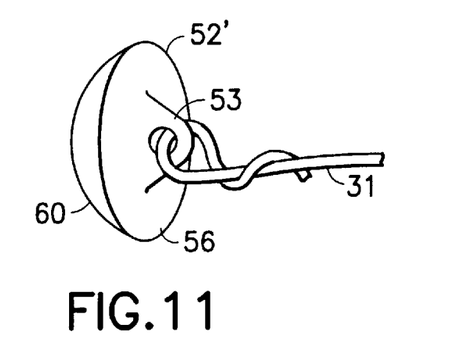
FIG. 11 is a perspective view of a second member for retaining the tension member in accordance with an alternative embodiment of this invention.

Most preferably, the end 54 of the tensioned first member 31 is linked to a swivel type second member 52 as shown in FIGS. 5 and 11. The preferred second member 52 has an essentially planar first face 56 for engaging the fuse wire locking members 50. The connection between the first member 31 and the second member 52 is a swivel arrangement which allows the first face 56 of the second member 52 to swivel about a longitudinal axis 58 of the first member 31 so that upon the severing of two of the fuse wires 50' as in FIG. 9 the second member 52 pivots out of engagement with the remaining fuse wire 50 as in FIG. 10 to release the tension on the first member 31 and thereby release the captured member 18 to deploy the desired device.

Figure 2:
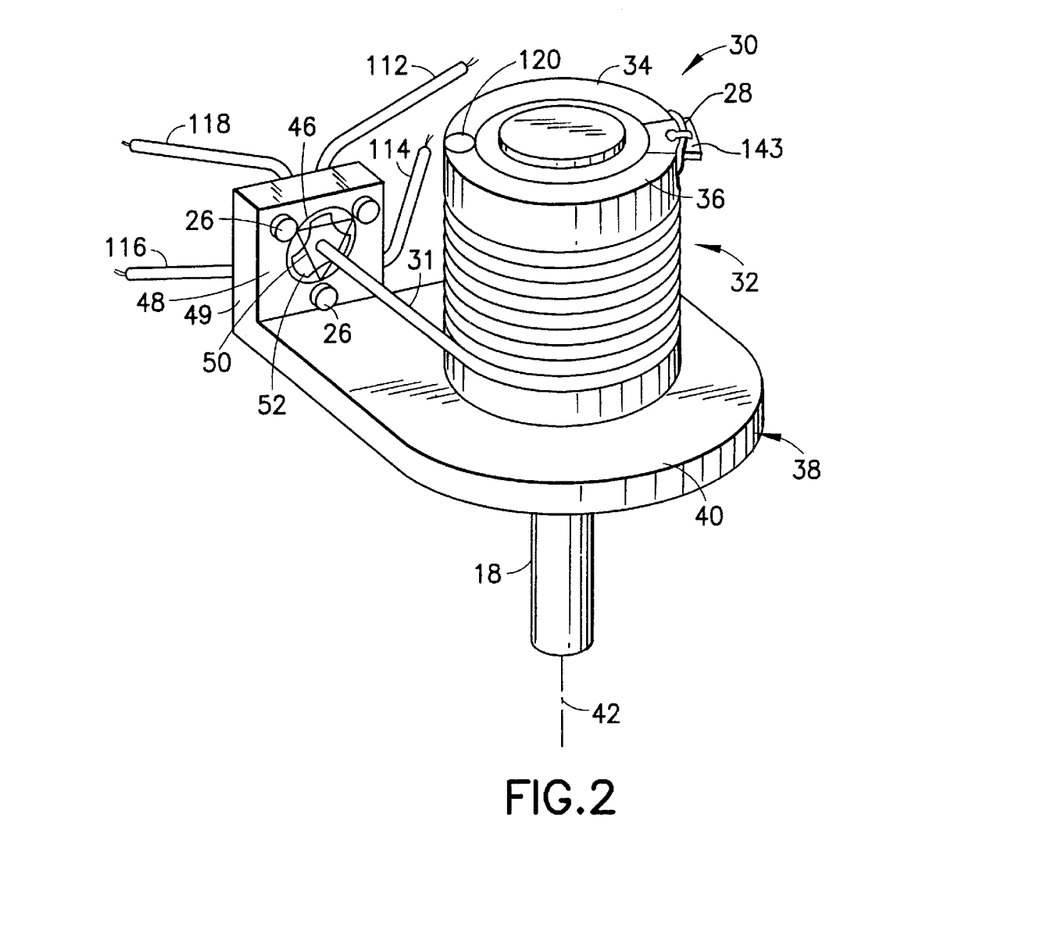
FIG. 2 is a perspective view of a release apparatus in accordance with one embodiment of this invention.
Figure 3:
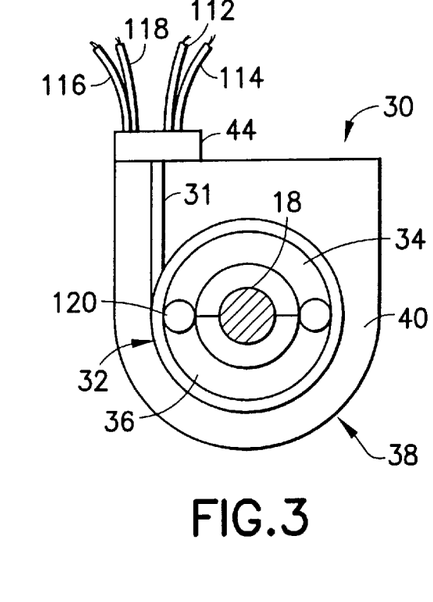
FIG. 3 shows the top view of a release apparatus of FIG. 2 when the captured member is stowed in place.
Figure 4:
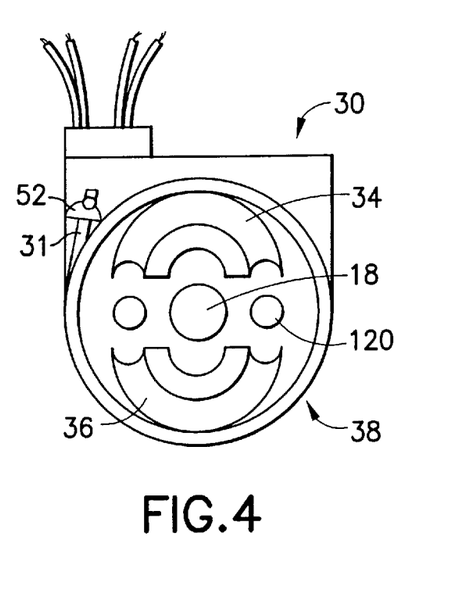
FIG. 4 shows the top view of a release apparatus of FIG. 2 when the captured member is released.

Referring to FIGS. 2, 3 and 4 the operation of the release apparatus 30 of this embodiment of the invention is illustrated. FIG. 3 shows the split spool 32 in its clamped position about the captured member 18. In this position the tensioned member 31 is tightly wrapped around the split spool halves 34 and 36 which are held in alignment by posts 120 and 143. The captured member 18 is clamped in the split spool 32 and prevents the desired device from deploying. When the release apparatus 30 is actuated, the second member 52 is released by the fuse wires 50 and the tension on the tensioned member 31 is also released. The tensioned member 31 uncoils and allows the split spool halves to separate as in FIG. 3, thereby releasing the captured member 18 and deploying the desired device (not shown).

Figure 6:
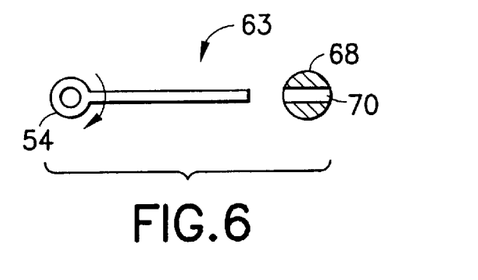
FIG. 6 is a partial cross-section of a tension member termination and retention ball in accordance with an embodiment of the invention.

One embodiment of a second member as shown in FIGS. 5, 6 and 10 has curved second face 60 opposed to the first planar face 56 and a centrally located hole 62 extending from the first planer face 56 to the second curved face 60. The hole preferably flares outwardly in a direction from the first planer face 56 to the second curved face 60. The first member 31 extends through the hole 62 in the second member 52 from the first planer face 56 toward the second curved face and includes a rounded termination 63 at its free end 54 which is adapted to engage the flared wall 64 of the hole 62 so that the first face 56 of the second member 52 can swivel about the longitudinal axis 58 of the first member 31.

Referring now to FIGS. 5 and 6 the rounded termination 63 in accordance with a preferred embodiment of this invention will be described in more detail. The rounded termination is composed a locking ball shaped member 68 having a centrally located hole 70 through which the first member 31 passes. The ball 68 is adapted to engage the flared wall of the 64 of the hole 62 in the second member 52. The end 54 of the first member 31 is then expanded so that it can not be pulled back through the hole 70, by forming a closed loop. The first member 31 is twisted several times to secure the closed loop as shown, however, any other desired approach known in the art could be used such as cold heading. This close loop 54 is pulled against the locking ball 68 and then against the second member or swivel 52. The rounded termination 63 is preferred, however, any suitable termination which facilitates the swiveling action of the second member 52.

Referring again to FIGS. 5 to 10 preferably the opening 46 is generally circular and the first face 56 of the second member 52 has a generally circular periphery with a diameter somewhat smaller than the opening 46. The curved second face 60 is preferably generally hemispherical in shape. Preferably the second member 52 includes a series of three slots or open cuts 66 extending longitudinally from the first face 56 of the second member 52 to the second face 60 of the second member 52 so that the longitudinal direction of the slots 66 is generally perpendicular to the longitudinal direction of the locking members. Each of the three slots 66 is arranged adjacent each one of the electrical contacts 26. The edge 67 of the slot 66 is arranged to be perpendicular to the longitudinal direction of the fuse wire. The slots 66 serve to prevent the fuse wire locking members 50 from slipping off the first face 56 of the second member 52 and causing premature release. The slots 66 are rounded to avoid sharp edges. It is possible for the second member 52 to rotate about the longitudinal direction of the first member 31 such that the open cuts 66 are not perpendicular to the longitudinal direction of the locking members 50. Consequently the open cuts 66 can not prevent the locking members 50 from slipping.

Figure 18:
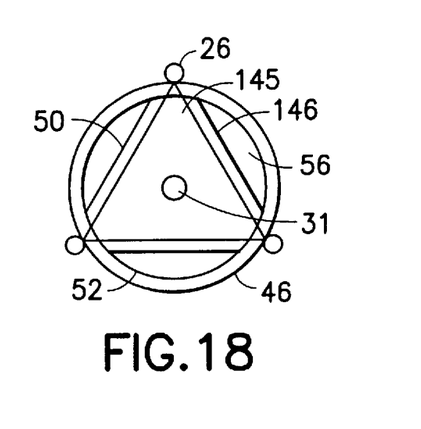
FIG. 18 is a partial front view of the tension member retention system in accordance with another preferred embodiment of this invention.
Figure 19:
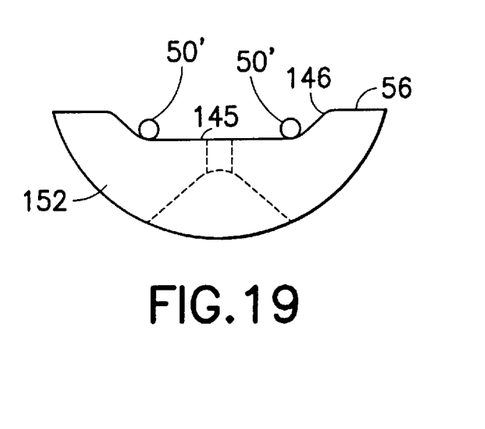
FIG. 19 is a partial side view of the tension member retention system of FIG. 18.

Referring not to FIGS. 18 and 19 a further preferred embodiment of the invention is shown. In this embodiment the second member 152 is not provided with slots 66 as in the previous embodiment. Instead the second member 152 includes a recess 145 in the first planar surface 56 having a triangular (or other desired) shape with the apexes of the triangular recess adjacent the fuse wire terminations or contacts 26 cut off or open to permit the fuse wires 50 to pass through. The walls 146 define the recess 145 and are arranged adjacent and parallel to the fuse wires 50. The walls 146 do not meet at the regions adjacent the contacts 26 in order to provide an opening for the fuse wires to pass through. The fuse wires are restrained within the recess 145 so that the second member 152 can not rotate about the axis of the first member 31. Therefore in operation the walls 146 prevent the locking members 50 from slipping off the second member 152.

Referring now to FIG. 2, the electrical contacts 26 are equally spaced about the opening 46 so that they can control the length of the locking members 50 between two adjacent electrical contacts 26. Any desired feature as are known in the art can be used to prevent electrical contact 26 from turning and causing the locking members 50 to be loosen. In the embodiment shown in FIG. 5, for example, the contacts 26 have a rectangular cross-section which serves this purpose, however, the invention is not intended to be limited to this example and any desired approach could be used.

In another embodiment, as shown in FIG. 11, second member 52' is configured with an eyelet 53 for engagement with the first member restraining wire 3 1. In this embodiment the tensioned member 31 is inserted through the eyelet 53 and then twisted about itself to provide a secure connection between the tensioned member 31 and the second member 52'. This simplified approach also allows the second member 52' to swivel in the same manner as the member 52 described by reference to FIG. 10. Any desired method for providing a swiveling connection between the second member 52 and the tensioned member 31 can be employed.

The fuse wire locking members 50 are attached to the electrical contacts 26 preferably to form a generally triangular arrangement over the opening 46 as in FIG. 7. One fuse wire locking member 50 is fastened between each two adjacent contacts 26. The fuse wire locking members 50 are pulled straight and tight between the adjacent contacts 26 and securely fastened at the sides of the contacts 26 closer to the center of the cylindrical hole 46. Each end of the fuse wire locking member 50 is securely fastened on one of the contacts 26. Additional tension applied to the fuse wire locking member 50 by the second member 52 must not cause the fuse wire 50 to loosen from the contact 26. Preferably total of three fuse wire locking members 50 are fastened between the contacts 26 in a triangular configuration.

Preferably before the fuse wire locking members 50 are fastened on the electrical contacts, the swiveling second member 52, which is attached to the tensioned member 31, is inserted in the opening 46. The locking members 50 are then fastened to the contacts 26 as described above. The tensioned member 31 then pulls the attached swiveling second member 52 against the triangle formed by the contact lines of the locking members 50 and the second member 52. If one of the locking members 50 fractures, the triangle is downsized. As long as the tensioned member 31 stays inside the triangle, the second member will not go through this locking member 50 arrangement. In a preferred embodiment, the tensioned member 31 is a steel wire.

Figure 12:
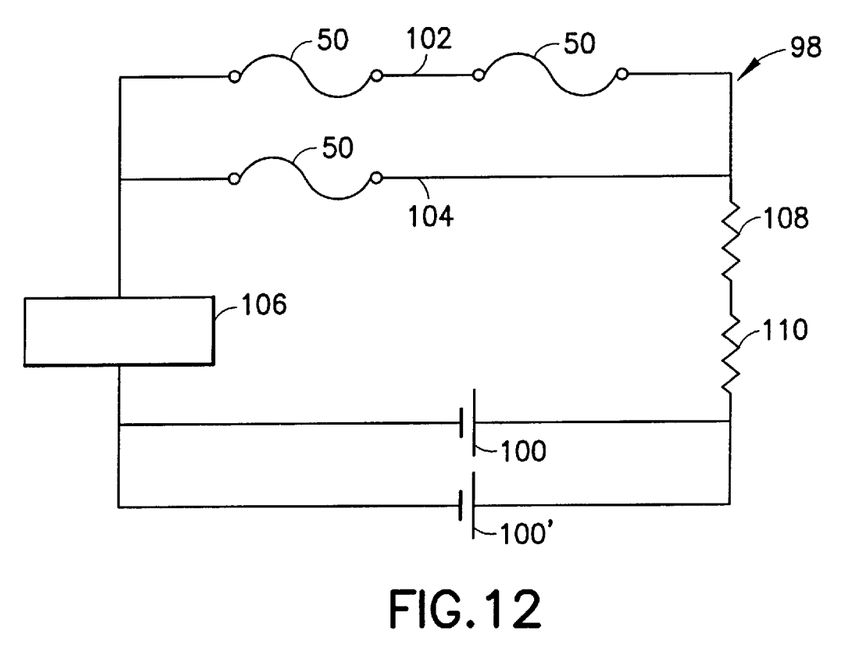
FIG. 12 is an electrical schematic diagram of one embodiment of a circuit for actuation of the release apparatus of this invention.
Figure 13:
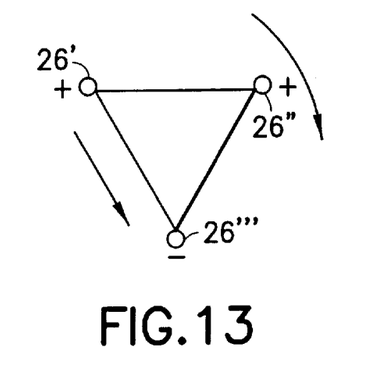
FIG. 13 is a schematic view of the fuse wire arrangement in accordance with a preferred embodiment of this invention illustrating the redundant nature of the actuation circuitry.
Figure 14:
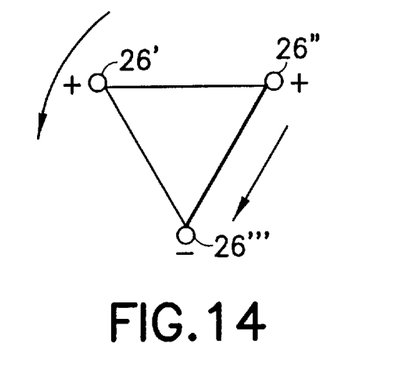
FIG. 14 is a schematic view of the fuse wire arrangement in accordance with a preferred embodiment of this invention illustrating the redundant nature of the actuation circuitry.

Referring now to FIGS. 12–14 there is shown a preferred embodiment of a control circuit 98 for actuating the release apparatus 32 preferably by selectively severing by melting at least two of the fuse wire locking members 50 when deployment of a solar array of other device is desired, however, any desired method of severing the locking members could be employed. Preferably each fuse wire locking member 50 is selected to possess a resistance of at least about 0.75 Ohm.

The exemplary circuit 98 includes a power source 100 connected in parallel to two fuse circuit paths 102 and 104. Path 102 includes two fuse members 50 arranged in series. Path 104 includes a single fuse member 50. Actuation is provided by switching the power source on by any conventional means such as a switch 106 which may be actuated by a computer (not shown) or by other means including by hand. Resistors 108 and 110 are preferably arranged in series with the power source 100 to provide an appropriate load for the power source.

During actuation, preferably a current of at least about 6.25 Amps is inputted to the circuit 98 from the power source 100. The current is directed to flow through the two paths, 102 with dual fuses in series and 104 with a single fuse. The fuse wire 50 in the single-fuse path 104 will be melted first due to a higher current being applied. Then, all of the input current (6.25 Amps minimum) flows through the dual-fuse path 102 and causes at least one of the fuses 50 to melt. The active circuit is then open and no more current is drawn from the power source 100. Since at least two of the three fuse wires 50 break, the restraining arrangement formed by the fuse wires 50 disappears. The swiveling second member 52 can rotate around a single surviving fuse wire 50 and be released thereby releasing the restraining tensioned member 32 to deploy the solar array of other desired device. Referring to FIGS. 2 and 12 to 14, the redundant electrical paths 102 and 104 are created by connecting a first contact 26' to the positive end of a primary circuit using wire 112. A second contact 26" is connected to the positive end of a redundant circuit using wire 118. The third contact 26''' is connected to the negative ends of both primary and redundant circuits using wires 116 and 114. Preferably the two negative ends preferably have independent connections with the third contact 26''', thereby ensuring that the negative contact does not have a single-point failure. Using this arrangement as shown in FIGS. 13 and 14 the electrical actuation paths are truly redundant. The actuation current can go through two optional paths as shown by the arrows 144 for the single fuse wire 50 path 104 and the arrows 122 for the dual fuse wire 50 path 102.

Figure 15:
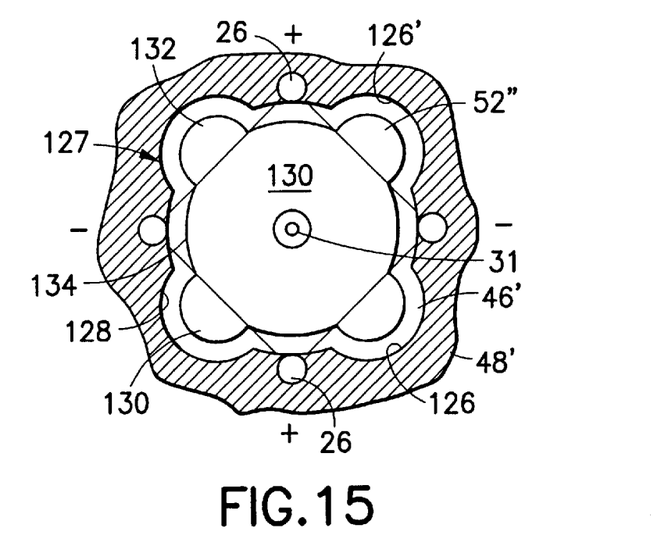
FIG. 15 is a partial side view showing an alternative fuse wire retention arrangement in accordance with a further embodiment of this invention.
Figure 16:
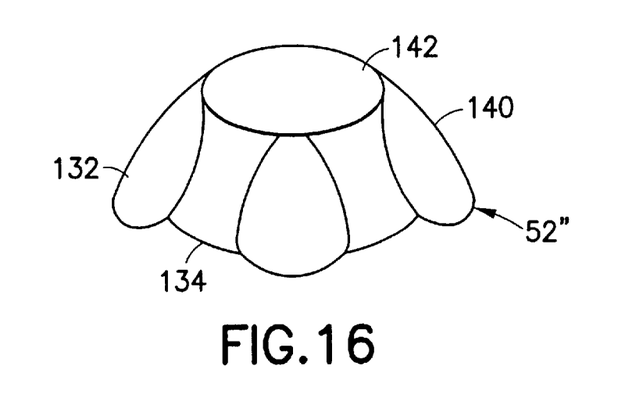
FIG. 16 is a perspective view of a second member for retaining the tension member in accordance with an additional alternative embodiment of this invention.
Figure 17:
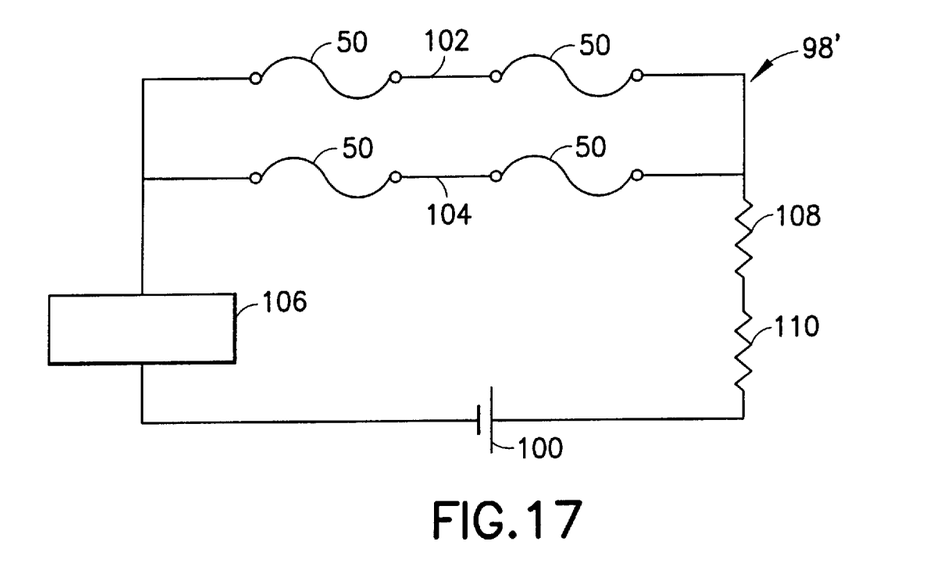
FIG. 17 is an electrical schematic diagram of an alternative embodiment of a circuit for actuation of the release apparatus of this invention.

This invention is susceptible to other embodiments such as that shown in FIGS. 15 to 17. While the embodiment of the invention described above has three fuse wire locking members 50 any desired number of fuse wires 50 could be employed. In the alternative preferred embodiment of this invention shown in FIG. 15 four fuse wire locking members 50 are used which are essentially arranged in a square about the opening 126. The opening 126 is generally square in shape with a series of three flutes 128 making up each side 127 of the square opening. The flutes 128 comprise major flutes at the corners of the opening 126 separated from each other by a minor flutes located centrally of each side of the opening 126. The second member 52" used in this embodiment is different from the previous embodiments in that its operative face 130 has a periphery defining four wings or major convex projections 132 as shown in FIG. 15 separated by convex slot portions or minor projections 134. The major flutes 128 at the corners of the opening 126 define four slots which are opposed by the wings 132 of the second member 52" and which prevent the second member 52" from rotating in the opening 126. There are four electrical contacts 26. Each electrical contact 26 is located essentially equally spaced around the opening 126 between two adjacent corner flutes 128 and adjacent the flutes 126 arranged centrally of each side 127 of opening 126.

Referring to FIG. 16, the second member 52" has curved second face 140 opposed to the first planar face 130 and a centrally located hole 142 extending from the first planer face 130 to the second curved face 140. The hole preferably flares outwardly in a direction from the first planer face 130 to the second curved face 140. The first member 31 (not shown) extends through the hole 142 in the second member 52" and may held in place in the same manner as discussed above by reference to FIG. 5. The wings 132 are arranged at each corner of the second member 52" and have a convex curved surface transversely of the hole 126 and a convex curved surface longitudinally of the hole 126 to form the smoothly curved projections 132 as shown. The minor projections 134 preferably are arranged between each adjacent pair of wings 132 and together define a generally conical surface whose diameter is less than the diagonal distance between the outer periphery of the wings 132 at the corners of the second member 52".

The preferred embodiment of this invention described by reference to FIG. 15 requires that at least two adjacent fuse wire blocking members 50 be severed in order to release the tensioned member 31 and deploy the desired device. This is accomplished using a circuit 98' similar to the circuit described by reference to FIG. 12. Similar elements have been given the same reference numbers in both of the circuits 98 and 98'. Circuit 98' differs from circuit 98 only by the addition of a second fuse wire 50 in series in the circuit path 104. The circuit 98' would operate in a similar fashion to the circuit of FIG. 12. Upon actuation of the release apparatus the fuse 50 pairs in either or both of the circuit paths 102 and 104 would be severed by melting to release the second member 52".

Referring now to FIGS. 15 and 17 there is one-to-one correspondence between the circuitry connectors (not shown) and the electrical contacts 26. The positive connectors are connected to opposing positive electrical contacts 26 and the negative connectors are connected to opposing negative electrical contacts 26 in an alternating arrangement. Therefore, the fuse wires are arranged in two paths 102 and 104 as shown in FIG. 17. Equivalent current goes through each path 102 and 104 to sever two or more fuse wires simultaneously.

This embodiment of the invention may be subject to a release failure if one of the negative connectors is not grounded. The reason is that the actuation characteristics change since the actuation current would go through two paths as shown in FIG. 15, one of which is composed of single fuse and the other is composed of three fuses in series. The tension member 31 can be released only if two adjacent fuse wire locking members 50 are severed. In order to ensure that both negative electrical contacts can be grounded, one component is used for both negative electrical contacts and two ground wires 114 and 116 are connected to this component separately. In general the use of three locking members 50 is preferred.

If desired a redundant power supply 100' may be included in parallel with the primary power supply 100. This design maintains the redundancy of the electrical input path 102 and 104. When the primary power supply 100 cannot supply the actuation current, the redundant power supply 100' can support the actuation. The actuation characteristics associated with primary power supply 100 is the same as the that associated with the redundant power supply 100'.

It is apparent that there has been provided in accordance with the invention a highly reliable release apparatus that fully satisfies the objects, means and advantages set forth hereinabove. While the invention has been described in combination with embodiments thereof, it is apparent that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A highly reliable release apparatus for controlling the deployment of a device by restraining or releasing a first member under tension which respectively prevents or allows the deployment of the device, the apparatus comprising:

a support member having an opening, the support member having a first face about said opening;

a second member capable of being attached to said first member, the second member being located within said opening when said first member is in tension;

at least three destructible locking members arranged on said first face of said support member for restraining said second member within said opening in said support member in order to maintain tension on said first member;

said second member being attached to said first member in a manner such that at least two of said locking members must be severed before the restraint on said second member is released; and a control system for actuating said release apparatus by selectively severing at least two of said locking members when deployment of said device is desired.

2. An apparatus as in claim 1 wherein, electrical contacts are supported about said opening by said support member and said locking members comprise fuse wires which are attached to said electrical contacts to form a generally triangular arrangement over said opening.

3. An apparatus as in claim 1 wherein said control system is adapted to sever said fuse wires by applying a current to said fuse wires and wherein said fuse wires are arranged in two parallel paths, a first primary path contains a single one of said fuse wires which will be first severed by melting due to the application of a current and a second fuse path which contains a second and third of said fuse wires in series, whereby following the severing of the first fuse wire all of the input current flows loss through the second fuse path to sever at least one of the remaining fuse wires.

4. An apparatus as in claim 2 wherein said second member has an essentially planar first face for engaging said locking members which comprise fuse wires and the connection between the first member and the second member is a swivel arrangement which allows the first face of said second member to swivel about a longitudinal axis of the first member so that upon the severing of at least two of the fuse wires the second member pivots out of engagement with the remaining fuse wire to release the tension on the first member.

5. An apparatus as in claim 4 wherein said second member has a curved second face opposed to said first planar face and a centrally located hole extending from said first planer face to said second curved face, said hole flaring outwardly from said first planer face to said second curved face.

6. An apparatus as in claim 5 wherein said first member extends through said hole in said second member from said planer face toward said second face and includes a round termination at its free end which is adapted to engage the flared hole so that the second member can swivel about the longitudinal axis of the first member.

7. An apparatus as in claim 6 wherein said opening is generally circular and said first face of said second member is generally circular with a diameter smaller than said opening, and wherein said second face is generally hemispherical and wherein said second member includes a series of slots extending from the first face of said second member to the second face of the member with each of said slots being arranged so that it is adjacent each of said electrical contacts, whereby said slots serve to prevent the fuse wires from slipping of the first face of said second member.

8. An apparatus as in claim 2 wherein at least four destructible locking members are arranged on said first face of said support member to form a generally square arrangement over said opening.

9. An apparatus as in claim 8 wherein, said control system is adapted to sever at least two adjacent ones of said fuse wires by applying a current to said fuse wires and wherein said fuse wires are arranged in two parallel paths, a first fuse path which contains a first and second of said fuse wires in series and a second fuse path which contains a third and fourth of said fuse wires in series, whereby following the severing of the fuse wires in one of said paths, by melting due to the application of a current, all of the input current flows through the other fuse path to sever the remaining fuse wires, said fuse wires in each of said paths being adjacent to one another.

10. An apparatus as in claim 9 wherein said second member has an essentially planar first face for engaging said locking members which comprise fuse wires and the connection between the first member and the second member is a swivel arrangement which allows the first face of said second member to swivel about a longitudinal axis of the first member so that upon the severing of at least two adjacent fuse wires the second member pivots out of engagement with the remaining fuse wires to release the tension on the first member.

11. An apparatus as in claim 10 wherein said second member has a curved second face opposed to said first planar face and a centrally located hole extending from said first planer face to said second curved face, said hole flaring outwardly from said first planer face to said second curved face.

12. An apparatus as in claim 11 wherein said first member extends through said hole in said second member from said planer face toward said second face and includes a round termination at its free end which is adapted to engage the flared wall of the hole so that the second member can swivel about the longitudinal axis of the first member.

13. An apparatus as in claim 12 wherein said opening is generally square and said first face of said second member is generally square with a width smaller than said opening, and wherein said first face of said second member has a periphery comprised of major curved projections at the corners of said square, separated by minor curved projections arranged between adjacent major projections centrally of each side of the square and wherein said opening has a series of major flutes arranged in opposition to each of said major projections and a series of minor flutes arranged in opposition to said minor projections, whereby said second member is prevented from rotating in said opening.

14. An apparatus as in claim 4 wherein said planar face of said second member includes a recess defined by walls arranged adjacent and parallel to said fuse wires, said walls having openings adjacent to terminations of said fuse wires, said fuse wires in operation being restrained within said recess so that said second member can not rotate about an axis of said first member.

15. An apparatus as in claim 14 wherein said recess has a triangular shape with the apexes of the triangles being open and arranged adjacent said terminations.

16. An apparatus as in claim 13 wherein said control system includes a redundant power supply which is provided in parallel with a primary power supply, whereby the redundancy of the first and second electrical paths is maintained.

* * * * *